United States Patent
Okada et al.

(10) Patent No.: US 9,073,534 B2
(45) Date of Patent: Jul. 7, 2015

(54) VEHICLE CONTROL SYSTEM

(71) Applicant: MAZDA MOTOR CORPORATION, Hiroshima (JP)

(72) Inventors: Kohei Okada, Hiroshima (JP); Atsushi Ohshita, Kure (JP); Tomoya Mayumi, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/323,426

(22) Filed: Jul. 3, 2014

(65) Prior Publication Data

US 2015/0019091 A1    Jan. 15, 2015

(30) Foreign Application Priority Data

Jul. 12, 2013   (JP) .................................. 2013-145998

(51) Int. Cl.
*G06F 17/00*   (2006.01)
*B60W 10/06*   (2006.01)
*B60W 10/20*   (2006.01)

(52) U.S. Cl.
CPC ............... *B60W 10/06* (2013.01); *B60W 10/20* (2013.01)

(58) Field of Classification Search
None
See application file for complete search history.

(56) References Cited

FOREIGN PATENT DOCUMENTS

JP    2007-247579 A    9/2007

*Primary Examiner* — Dirk Wright
(74) *Attorney, Agent, or Firm* — Studebaker & Brackett PC

(57) ABSTRACT

Disclosed is a vehicle control system capable of selectively setting one of a normal mode and a sport mode as a vehicle travel mode, wherein normal-mode and sport-mode target acceleration characteristics are set in such a manner that a sport-mode target acceleration is greater than a normal-mode target acceleration, when compared under the same conditions in terms of accelerator angle and vehicle speed, and a difference between the sport-mode target acceleration and the normal-mode target acceleration becomes smaller along with an increase in the vehicle speed, when compared under the same condition in terms of the accelerator angle.

6 Claims, 5 Drawing Sheets

VEHICLE CONTROL SYSTEM

TECHNICAL FIELD

The present invention relates to a vehicle control system, and more particularly to a vehicle control system configured to set a target acceleration according to accelerator angle.

BACKGROUND ART

In a vehicle such as an automotive vehicle, there has been generally known a technique of setting a target acceleration characteristic in such a manner that a target acceleration of the vehicle become larger along with an increase in amount of depression of an accelerator pedal operated by a driver (accelerator angle), and controlling engine output torque to achieve the set target acceleration characteristic.

In connection with the technique of setting such a target acceleration characteristic, for example, JP 2007-247579A discloses setting a target acceleration based on an accelerator angle-target acceleration correlation preset in such a manner that the target acceleration becomes larger as an increase in the accelerator angle, and an accelerator angle detection value to be sequentially input.

Meanwhile, a level of required acceleration for a vehicle is generally higher in a low vehicle speed region than in a high vehicle speed region. Thus, it is desirable to set the target acceleration characteristic in such a manner that the target acceleration becomes smaller along with an increase in the vehicle speed, even under the same condition in terms of the accelerator angle. This makes it possible to realize high fuel economy performance in the high vehicle speed region while enhancing accelerating performance in the low vehicle speed region.

Further, even under the same conditions in terms of the vehicle speed and the accelerator angle, a level of acceleration sensuously evaluated as adequate varies depending on whether or not a driver has an aggressive intention. For example, it is considered that an aggressive driver intends to accelerate a vehicle at a higher acceleration, mainly in low and medium vehicle speed regions. However, continually setting the target acceleration characteristic in a relatively high acceleration region to suit aggressive drivers will lead to deterioration in fuel economy performance.

SUMMARY OF THE INVENTION

It is therefore an object of the present invention to provide a vehicle control system capable of enhancing vehicle accelerating performance in response to a driver's aggressive intention, while suppressing deterioration in fuel economy performance.

As a solution to the above technical problem, the present invention relates to a vehicle control system for controlling a vehicle equipped with an engine and a transmission coupled to the engine. The vehicle control system comprises: a mode setting section configured to selectively set one of a normal mode and a sport mode as a vehicle travel mode; a target-acceleration-characteristic storage section storing therein a target acceleration characteristic with respect to each accelerator angle, wherein the target acceleration characteristic is set for each of the normal mode and the sport mode, in such a manner that a target acceleration of the vehicle becomes smaller along with an increase in vehicle speed; a gear-ratio-characteristic storage section storing therein a gear ratio characteristic for changing a gear ratio of the transmission in a given pattern for each of the normal mode and the sport mode, based on the accelerator angle and the vehicle speed; a target acceleration calculation section configured to, in a situation where one of the normal mode and the sport mode is set by the mode setting section, calculate a target acceleration value using the target acceleration characteristic, based on the accelerator angle and the vehicle speed; a gear ratio calculation section configured to, in the situation where one of the normal mode and the sport mode is set by the mode setting section, calculate a gear ratio value using the gear ratio characteristic, based on the accelerator angle and the vehicle speed; and an engine control section configured to, based on the target acceleration value calculated by the target acceleration calculation section, and the gear ratio value calculated by the gear ratio calculation section, control engine output torque in such a manner as to allow an acceleration of the vehicle to become coincident with the calculated target acceleration value. The target acceleration characteristics are set in such a manner that the target acceleration for the sport mode is greater than the target acceleration for the normal mode, when compared under the same conditions in terms of the accelerator angle and the vehicle speed, and a difference between the target acceleration for the sport mode and the target acceleration for the normal mode becomes smaller along with an increase in the vehicle speed, when compared under the same condition in terms of the accelerator angle.

DESCRIPTION OF EMBODIMENTS

With reference to accompanying drawings, the present invention will now be described based on embodiments thereof.

Figure 1:
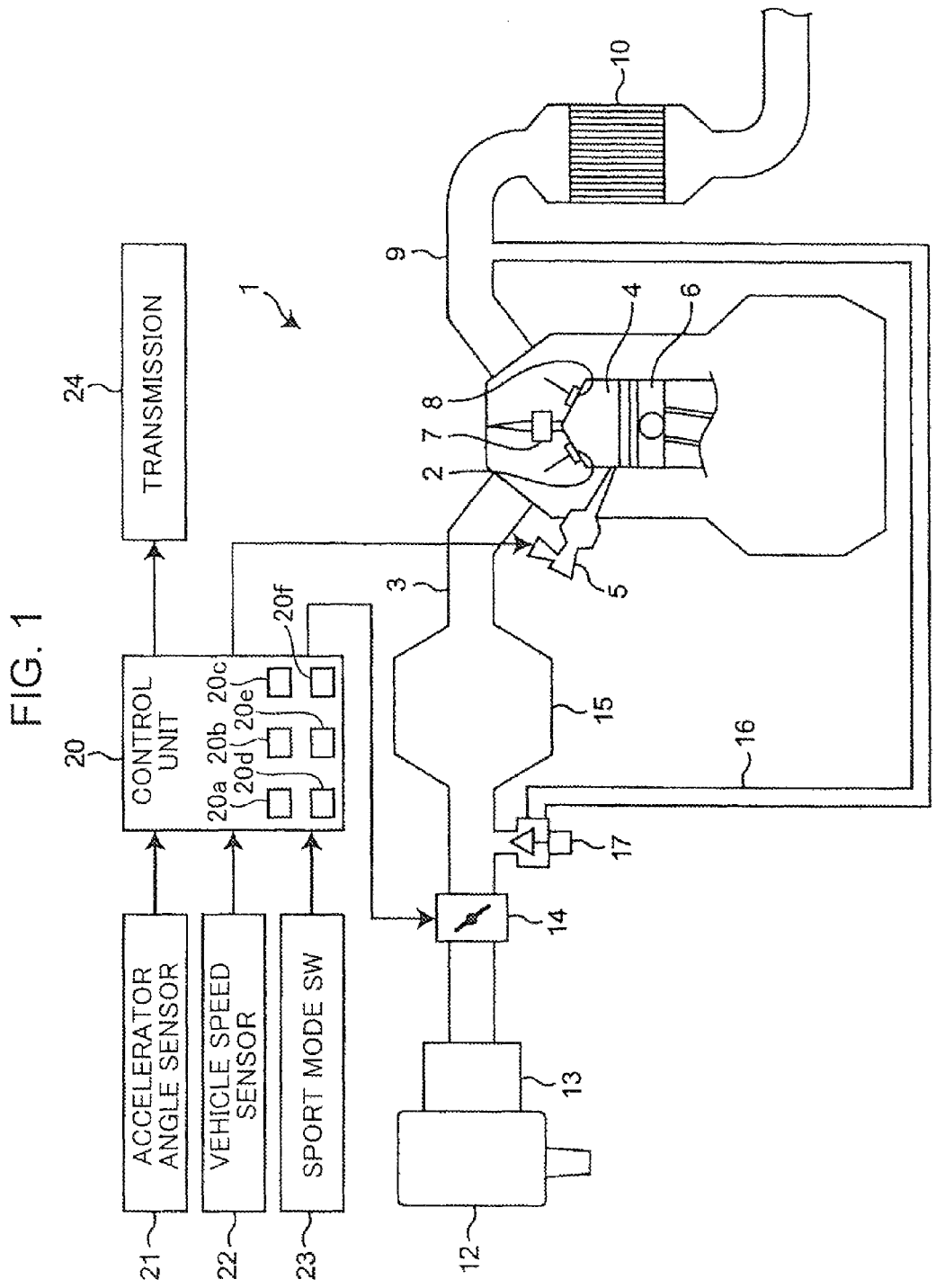
FIG. 1 is a diagram illustrating a schematic configuration of a vehicle control system according to a first embodiment of the present invention.

FIG. 1 is a diagram illustrating a schematic configuration of a vehicle control system according to a first embodiment of the present invention. As illustrated in FIG. 1, a vehicle (not illustrated) having the vehicle control system according to the first embodiment is equipped with an engine 1. The engine 1 is a gasoline engine using gasoline as fuel. In the engine 1, when an intake valve 2 is opened, combustion air is sucked from an intake passage 3 into a combustion chamber 4, and fuel is injected from a fuel injection value 5 into the sucked air in the combustion chamber 4 at a given timing to form an air-fuel mixture.

The air-fuel mixture in the combustion chamber 4 is compressed by a piston 6, and ignited by a spark plug 7 at a given timing to undergo combustion. Then, when an exhaust valve 8 is opened, combustion gas, i.e., exhaust gas, is discharged into an exhaust passage 9. The exhaust passage 9 is provided with an exhaust gas purifying device 10 interposed therein to purify exhaust gas.

The intake passage 3 is provided with: an air cleaner 12 for removing dust or the like from air; an air flow rate sensor 13 for detecting an air flow rate; an electronically-controlled throttle valve 14 configure to be opened and closed according to an amount of depression of an accelerator pedal (not illustrated) provided around a driver seat, thereby throttling air; and a surge tank 15 for stabilizing airflow, which are arranged in this order from an upstream side in an airflow direction.

The engine 1 also has an EGR passage 16 for recirculating a part of exhaust gas in the exhaust passage 9 to the intake passage 3, and an EGR control valve 17 provided in the EGR passage 16 to control an EGR gas flow rate.

This vehicle is further equipped with a transmission 24 coupled to the engine 1 and configured to transmit output torque of the engine 1 to wheels, and a control unit 20 for controlling the engine 1 and the transmission 24. The control unit 20 comprises a microcomputer as a major part thereof.

The control unit 20 is configured to receive an input of various signals including: a signal from an accelerator angle sensor 21 for detecting an amount of depression of the accelerator pedal (accelerator angle); a signal from a vehicle speed sensor 22 for detecting vehicle speed; and a signal from a sport mode switch (sport mode SW) 23 serving as a mode setting section for setting a vehicle travel mode.

The control unit 20 comprises an engine control section 20a for controlling the engine 1, and a transmission control section 20b for controlling the transmission 24. The engine control section 20a is configured to, based on various signals input from the accelerator angle sensor 21, the vehicle speed sensor 22, the sport mode SW 23 and others, control a device such as the throttle valve 14 and the fuel injection value 5 to thereby adjust the output torque of the engine 1. Similarly, the transmission control section 20b is configured to, based on various signals input from the accelerator angle sensor 21, the vehicle speed sensor 22, the sport mode SW 23 and others, control a speed change operation of the transmission 24.

In the vehicle having the vehicle control system according to the first embodiment, a driver or the like can select either one of a normal mode and a sport mode, as a vehicle travel mode. That is, the normal mode is set when the sport mode SW 23 is turned into an OFF state and thereby an OFF signal is input from the sport mode SW 23 into the control unit 20. On the other hand, the sport mode is set when the sport mode SW 23 is turned into an ON state and thereby an ON signal is input from the sport mode SW 23 into the control unit 20.

Alternatively, the mode setting section may comprise a normal mode switch and a sport mode switch, and configured to allow a driver or the like to turn one of the normal mode switch and the sport mode switch into an ON state, thereby switching between the normal mode and the sport mode, i.e., setting one of the normal mode and the sport mode.

The control unit 20 comprises a target-acceleration-characteristic storage section 20c. The target-acceleration-characteristic storage section 20c stores therein respective preset target acceleration characteristics for the normal mode and the sport mode (normal-mode and sport-mode target acceleration characteristics). The normal-mode target acceleration characteristic is a characteristic of a target acceleration of the vehicle during the normal mode (normal-mode target acceleration), which is variably defined based on accelerator angle and vehicle speed, and the sport-mode target acceleration characteristic is a characteristic of a target acceleration of the vehicle during the sport mode (sport-mode target acceleration), which is variably defined based on the accelerator angle and the vehicle speed.

Figure 2:
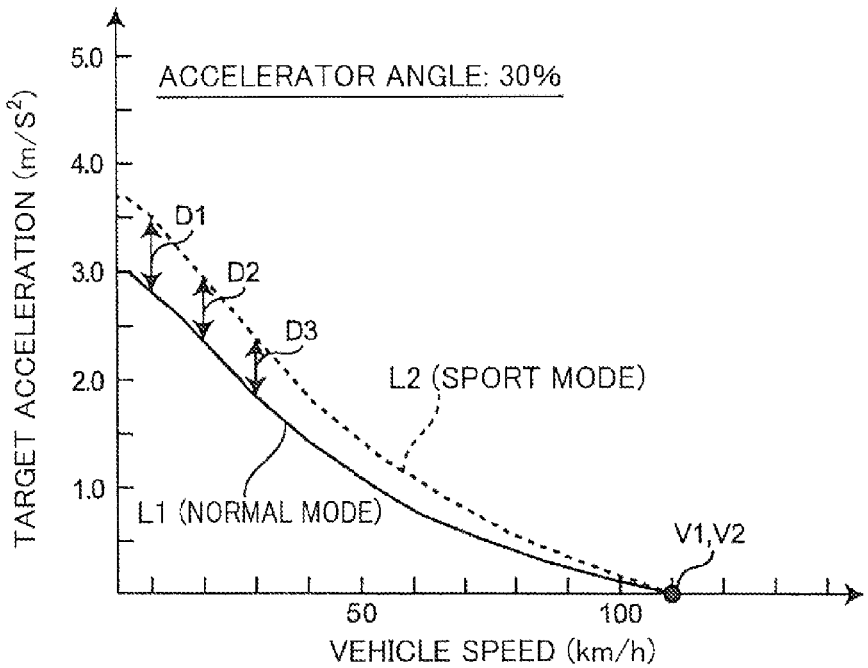
FIG. 2 is a graph illustrating normal-mode and sport-mode target acceleration characteristics in the vehicle control system according to the first embodiment.

FIG. 2 is a graph illustrating normal-mode and sport-mode target acceleration characteristics in the vehicle control system according to the first embodiment, wherein a relationship between the vehicle speed and the target acceleration is presented under a condition that the accelerator angle is fixed to 30%. In FIG. 2, the vehicle speed and the target acceleration are plotted, respectively, on the horizontal axis and the vertical axis, wherein the normal-mode target acceleration characteristic and the sport-mode target acceleration characteristic under the condition that the accelerator angle is fixed to 30% are represented, respectively, by the solid line L1 and the dashed line L2.

As illustrated in FIG. 2, the normal-mode target acceleration characteristic is set in such a manner that the target acceleration becomes smaller along with an increase in the vehicle speed, under a condition that the accelerator angle is maintained constant. In the normal mode, engine output torque is controlled according to the above target acceleration characteristic, so that it is possible to realize high fuel economy performance in a high vehicle speed region while enhancing accelerating performance in a low vehicle speed region.

The sport mode has a similar tendency to the normal mode. That is, the sport-mode target acceleration characteristic is set in such a manner that the target acceleration becomes smaller along with an increase in the vehicle speed, under the condition that the accelerator angle is maintained constant. However, the sport-mode target acceleration characteristic is set in such a manner that the sport-mode target acceleration is greater than the normal-mode target acceleration, when compared under the same conditions in terms of the accelerator angle and the vehicle speed.

Further, the sport-mode target acceleration characteristic is set in such a manner that a difference between the sport-mode target acceleration and the normal-mode target acceleration becomes smaller along with an increase in the vehicle speed, when compared under the same condition in terms of the accelerator angle. In FIG. 2, as for the difference between the sport-mode target acceleration and the normal-mode target acceleration, values thereof at vehicle speeds of 10 km/h, 20 km/h and 30 km/h are denoted, respectively, by D1, D2 and D3, wherein the difference therebetween is set to satisfy the following relation: D1>D2>D3.

In both of the normal mode and the sport mode, the target acceleration is set to become zero when the vehicle speed becomes sufficiently large. Particularly, in the first embodiment, the sport-mode target acceleration characteristic is set in such a manner that a vehicle speed at which the sport-mode target acceleration becomes zero is equal to a vehicle speed at which the normal-mode target acceleration becomes zero, when compared under the same condition in terms of the accelerator angle. That is, as illustrated in FIG. 2, under the condition that the accelerator angle is maintained constant, a vehicle speed V2 at which the sport-mode target acceleration becomes zero is set to be equal to a vehicle speed V1 at which the normal-mode target acceleration becomes zero.

FIG. 2 illustrates the normal-mode and sport-mode target acceleration characteristics under the condition that the accelerator angle is fixed to 30%. Similarly, at any other angle (except for 0%) in an accelerator angle range of 0% (non-depressed state) to 100% (fully-depressed state), each of the normal mode and sport-mode target acceleration characteristics is set in such a manner that the target acceleration becomes smaller along with an increase in the vehicle speed.

The relationship between the normal mode target acceleration characteristic and the sport-mode target acceleration characteristic at any other accelerator angle is the same as that under the condition that the accelerator angle is fixed to 30%. That is, the normal-mode and sport-mode target acceleration characteristics are set in such a manner that the sport-mode target acceleration is greater than the normal-mode target acceleration, when compared under the same conditions in terms of the accelerator angle and the vehicle speed, and a difference between the sport-mode target acceleration and the normal-mode target acceleration becomes smaller along with an increase in the vehicle speed, when compared under the same condition in terms of the accelerator angle, and wherein a vehicle speed at which the sport-mode target acceleration becomes zero is equal to a vehicle speed at which the normal-mode target acceleration becomes zero, when compared under the same condition in terms of the accelerator angle.

Figure 3:
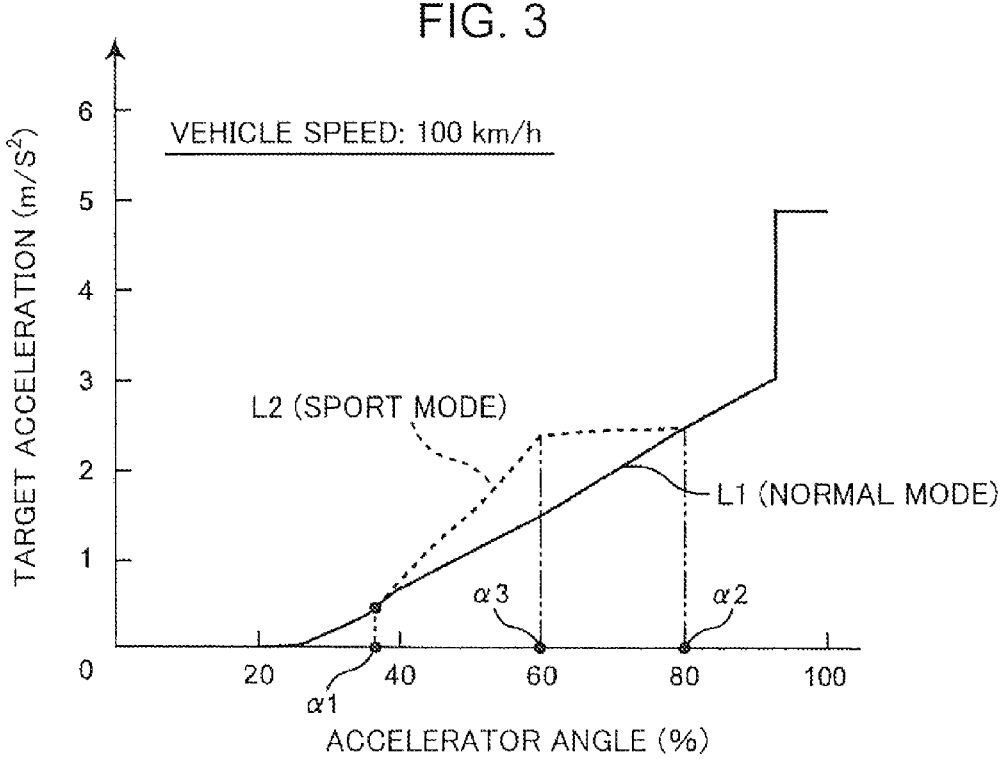
FIG. 3 is another graph illustrating normal-mode and sport-mode target acceleration characteristics in the vehicle control system according to the first embodiment.

FIG. 3 is another graph illustrating normal-mode and sport-mode target acceleration characteristics in the vehicle control system according to the first embodiment, wherein a relationship between the accelerator angle and the target acceleration is presented under a condition that the vehicle speed is fixed to 100 km/h. In FIG. 3, the accelerator angle and the target acceleration are plotted, respectively, on the horizontal axis and the vertical axis, wherein the normal-mode target acceleration characteristic and the sport-mode target acceleration characteristic under the condition that the vehicle speed is fixed to 100 km/h are represented, respectively, by the solid line L1 and the dashed line L2.

As illustrated in FIG. 3, the normal-mode and sport-mode target acceleration characteristics are set in such a manner that the sport-mode target acceleration is greater than the normal-mode target acceleration, in a given accelerator angle range, when compared under the same condition in terms of the vehicle speed. In FIG. 3, the sport-mode target acceleration is set to be greater than the normal-mode target acceleration, when the accelerator angle is in the range of α1 to α2.

Figure 4:
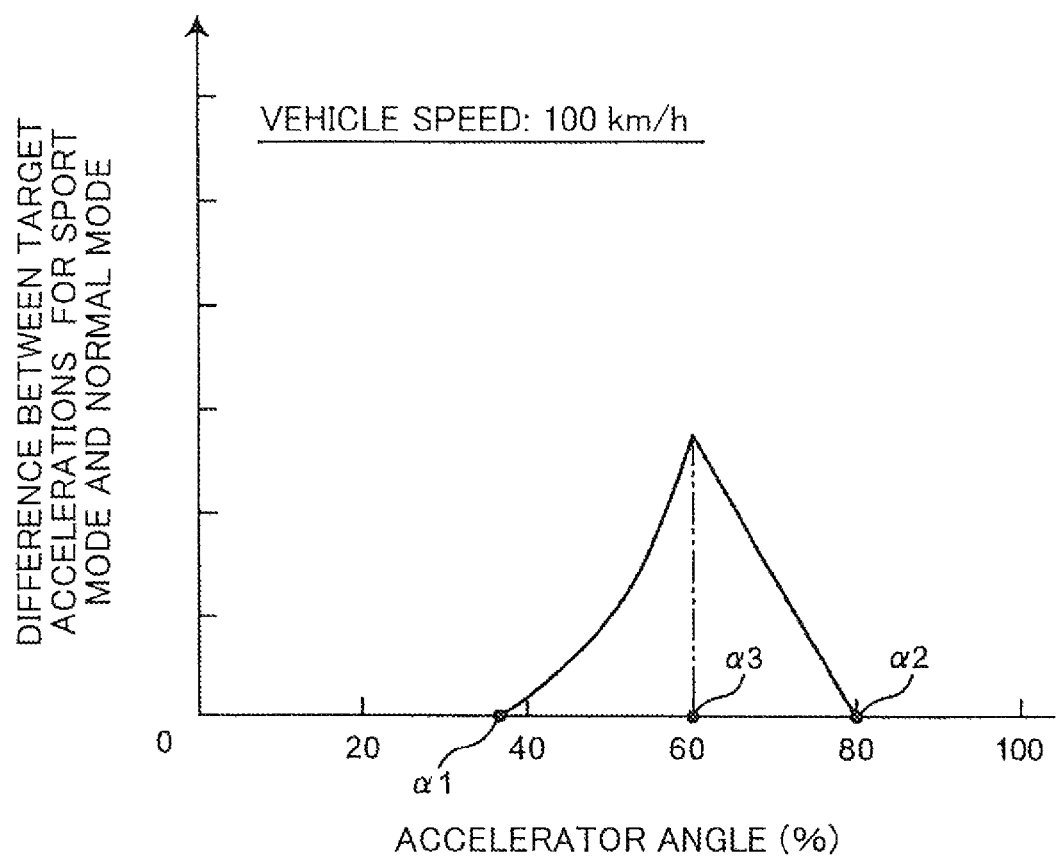
FIG. 4 is a graph illustrating a difference between a sport-mode target acceleration and a normal-mode target acceleration in the target acceleration characteristics illustrated in FIG. 3, in a relationship with acceleration angle.

FIG. 4 is a graph illustrating a relationship between a difference between the sport-mode target acceleration and the normal-mode target acceleration, and the acceleration angle, in the target acceleration characteristics illustrated in FIG. 3. As illustrated in FIG. 4, the normal-mode and sport-mode target acceleration characteristics are set in such a manner that a difference between the sport-mode target acceleration and the normal-mode target acceleration is maximized at an approximately central accelerator angle α3 in the range between two accelerator angles α1, α2 where the sport-mode target acceleration and the normal-mode target acceleration are different.

As above, the difference between the sport-mode target acceleration and the normal-mode target acceleration is set to be maximized at an approximately central accelerator angle α3 in the given accelerator angle range (α1 to α2) where the sport-mode target acceleration and the normal-mode target acceleration are different. In this case, during the sport mode, the accelerating performance can be sufficiently enhanced in an intermediate accelerator angle region which is frequently used during an accelerating operation.

For example, the accelerator angle at which the difference between the sport-mode target acceleration and the normal-mode target acceleration is maximized is largely shifted toward a small angle side (a side adjacent to α1) or a large angle side (a side adjacent to α2), with respect to the center of the given accelerator angle range, a difference in the target acceleration (amount of corrective increase) at the center of the given accelerator angle range is reduced, which is likely to cause a situation where the accelerating performance cannot be sufficiently enhanced in the intermediate accelerator angle region (e.g., 50 to 60%) which is frequently used during an accelerating operation. In contrast, when the difference between the sport-mode target acceleration and the normal-mode target acceleration is set to be maximized at the approximately central accelerator angle α3 in the given accelerator angle range, as illustrated in FIGS. 3 and 4, the target acceleration can be correctively increased intensively in the intermediate accelerator angle region which is frequently used during an accelerating operation, so that it becomes possible to give, to a driver who has selected the sport mode, good acceleration feel more suited to an intention of the driver.

The control unit 20 further comprises a gear-ratio-characteristic storage section 20d. The gear-ratio-characteristic storage section 20d stores therein a preset gear ratio characteristic for the normal mode (normal-mode gear ratio characteristic) and a preset gear ratio characteristic for the sport mode (sport-mode gear ratio characteristic). The normal-mode gear ratio characteristic is a characteristic of a gear ratio (shift pattern) of the transmission 24 during the normal mode (normal-mode gear ratio), which is variably defined based on the accelerator angle and the vehicle speed, and the sport-mode gear ratio characteristic is a characteristic of a gear ratio (shift pattern) of the transmission 24 during the sport mode (sport-mode gear ratio), which is variably defined based on the accelerator angle and the vehicle speed.

The control unit 20 further comprises a target acceleration calculation section 20e and a gear ratio calculation section 20f.

The target acceleration calculation section 20e is configured to calculate (determine) a target acceleration value using the target acceleration characteristic stored in the target-acceleration-characteristic storage section 20c, based on information about the vehicle travel mode (the normal mode or the sport mode) specified by a signal from the sport mode SW 23, and the accelerator angle and the vehicle speed specified by signals from the accelerator angle sensor 21 and the vehicle speed sensor 22.

The gear ratio calculation section 20f is configured to calculate (determine) a gear ratio value using the gear ratio characteristic stored in the gear-ratio-characteristic storage section 20d, based on information about the vehicle travel mode (the normal mode or the sport mode) specified by a signal from the sport mode SW 23, and the accelerator angle and the vehicle speed specified by signals from the accelerator angle sensor 21 and the vehicle speed sensor 22.

The target acceleration value and the gear ratio value each calculated by a respective one of the target acceleration calculation section 20e and the gear ratio calculation section 20f in the above manner will be used to control an output torque of the engine 1. That is, the engine control section 20a is configured to, based on the calculated target acceleration value and the calculated gear ratio value, control the output torque of the engine 1 in such a manner as to allow an acceleration of the vehicle to become coincident with the calculated target acceleration value.

Figure 5:
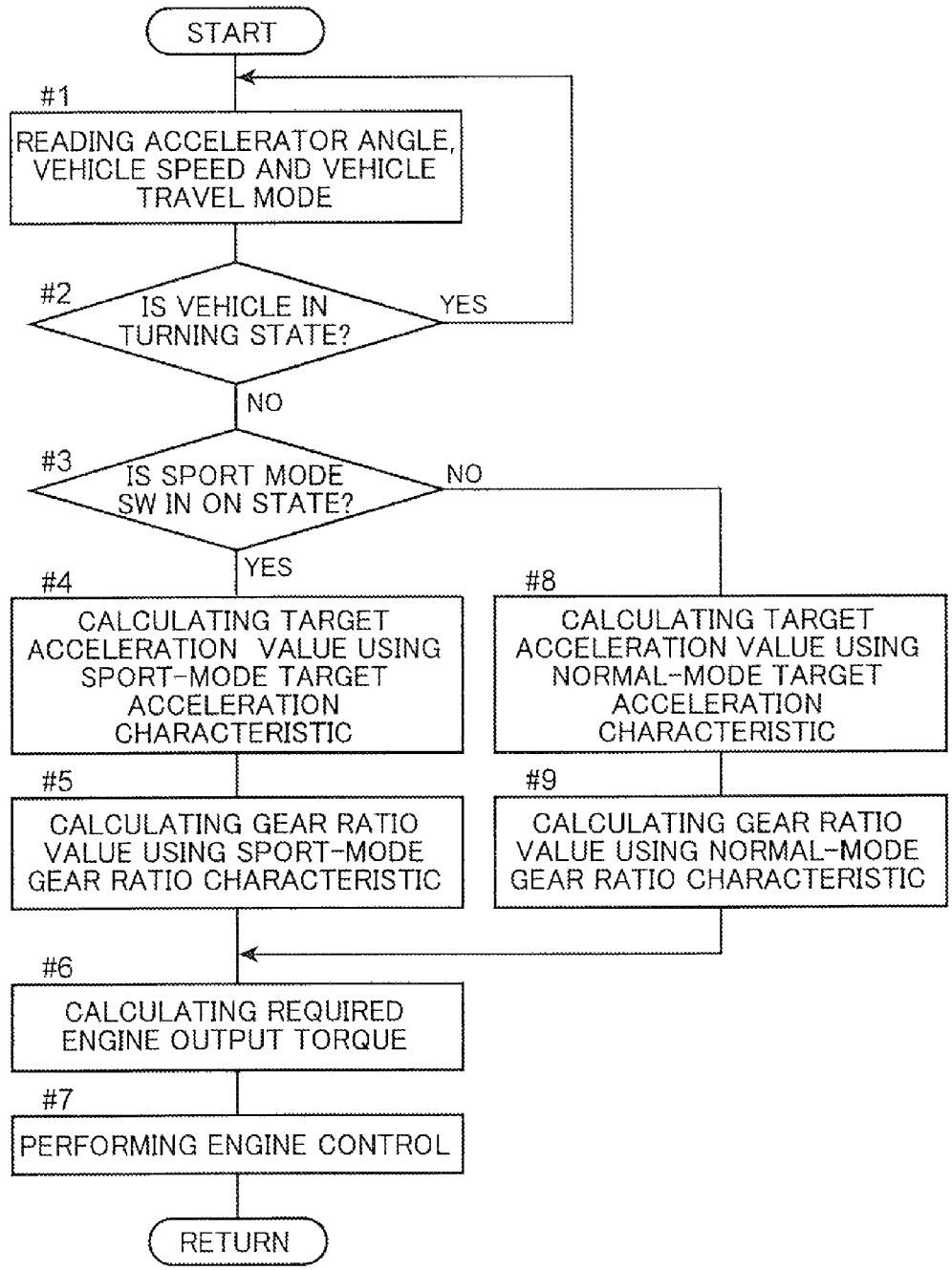
FIG. 5 is a flowchart illustrating a sequence of steps of vehicle engine output torque control.

FIG. 5 is a flowchart illustrating a sequence of steps of a process of controlling the output torque of the engine 1. Assume that, as a prerequisite for start of this control, the normal-mode and sport-mode target acceleration characteristics and the normal-mode and sport-mode gear ratio characteristics are preliminarily stored in the control unit 20 of the vehicle, as mentioned above.

Upon start of the control in FIG. 5, first of all, in Step #1, signals input from the accelerator angle sensor 21, the vehicle speed sensor 22 and the sport mode SW 23, i.e., signals indicative of the accelerator angle, the vehicle speed and the vehicle travel mode, are read. Then, in Step #2, it is determined whether or not the vehicle is in a turning state. For example, a steering angle sensor (illustration is omitted) is used to determine whether or not the vehicle is in a turning state.

When a result of the determination in the Step #2 is YES, i.e., when the vehicle is in the turning state, the Step #1 and the Step #2 will be repeated. On the other hand, when the result of the determination in the Step #2 is NO, i.e., when the vehicle is not in the turning state, in Step #3, it is determined whether or not the sport mode SW 23 is in an ON state, based on the signal input from the sport mode SW 23 and read in the Step #1.

When a result of the determination in the Step #3 is YES, i.e., when the sport mode SW 23 is in the ON state and therefore the sport mode is set, in Step #4, a target acceleration value of the vehicle is calculated using the sport-mode target acceleration characteristic, based on the accelerator angle and the vehicle speed each read in the Step #1.

Then, in Step #5, a gear ratio value of the transmission 24 is calculated using the sport-mode gear ratio characteristic, based on the accelerator angle and the vehicle speed each read in the Step #1.

Subsequently, based on the target acceleration value calculated in the Step #4, and the gear ratio value calculated in the Step #5, an output torque of the engine 1 required for allowing an acceleration of the vehicle to become coincident with the calculated target acceleration value is calculated (Step #6), and then operations of the throttle valve 14, the fuel injection valve 5 and others are controlled to allow the calculated torque to be output from the engine 1 (Step #7).

Next, control to be performed when the result of the determination in the Step #3 is NO, i.e., when the sport mode SW 23 is in an OFF state and therefore the normal mode is set, will be described below. In this case, in Step #8, a target acceleration value of the vehicle is calculated using the normal-mode target acceleration characteristic, based on the accelerator angle and the vehicle speed each read in the Step #1.

Then, in Step #9, a gear ratio value of the transmission 24 is calculated using the normal-mode gear ratio characteristic, based on the accelerator angle and the vehicle speed each read in the Step #1.

Subsequently, based on the target acceleration value calculated in the Step #8, and the gear ratio value calculated in the Step #9, an output torque of the engine 1 required for allowing an acceleration of the vehicle to become coincident with the calculated target acceleration value is calculated (Step #6), and then operations of the throttle valve 14, the fuel injection valve 5 and others are controlled to allow the calculated torque to be output from the engine 1 (Step #7).

As described above, the vehicle control system according to the first embodiment comprises: the sport mode SW 23 (mode setting section) configured to selectively set one of the normal mode and the sport mode; the target-acceleration-characteristic storage section 20c storing therein the normal-mode and sport-mode target acceleration characteristics; the gear-ratio-characteristic storage section 20d storing therein the normal-mode and sport-mode gear ratio characteristics; the target acceleration calculation section 20e configured to calculate a target acceleration value using one of the target acceleration characteristics, based on the accelerator angle and the vehicle speed; the gear ratio calculation section 20f configured to calculate a gear ratio value using one of the gear ratio characteristics, based on the accelerator angle and the vehicle speed; and the engine control section 20a configured to, based on the calculated target acceleration value and the calculated gear ratio value, control engine output torque in such a manner as to allow an acceleration of the vehicle to become coincident with the calculated target acceleration value.

Further, the target acceleration characteristics are set in such a manner that the sport-mode target acceleration is greater than the normal-mode target acceleration, when compared under the same conditions in terms of the accelerator angle and the vehicle speed, and a difference between the sport-mode target acceleration and the normal-mode target acceleration becomes smaller along with an increase in the vehicle speed, when compared under the same condition in terms of the accelerator angle.

As above, in the first embodiment, when compared under the same condition in terms of the accelerator angle, the target acceleration is set to a larger value during the sport mode than during the normal mode, so that it becomes possible to enhance vehicle accelerating performance during the sport mode, in response to a driver's aggressive intention to further accelerate the vehicle. In addition, the difference between the sport-mode target acceleration and the normal-mode target acceleration is set to become smaller along with an increase in the vehicle speed, so that it becomes possible to enhance accelerating performance mainly in a low vehicle speed region where a driver would have a desire for particularly high accelerating ability. On the other hand, accelerating performance in a high vehicle speed region is not enhanced beyond necessity, so that it becomes possible to effectively suppress deterioration in fuel economy performance.

Furthermore, in the second embodiment, when compared under the same condition in terms of the accelerator angle, the target acceleration characteristics are set in such a manner that a vehicle speed at which the sport-mode target acceleration becomes zero is equal to a vehicle speed at which the normal-mode target acceleration becomes zero, so that it becomes possible to prevent a situation where, when the switching between the normal mode and the sport mode is performed during a constant speed travel in which the target acceleration is set to zero, an acceleration is produced, thereby causing a feeling of strangeness.

A vehicle control system according to a second embodiment of the present invention will be described below. Except for the sport-mode target acceleration characteristic, the vehicle control system according to the second embodiment is the same as the vehicle control system according to the first embodiment. Thus, description of a common configuration therebetween will be omitted.

Figure 6:
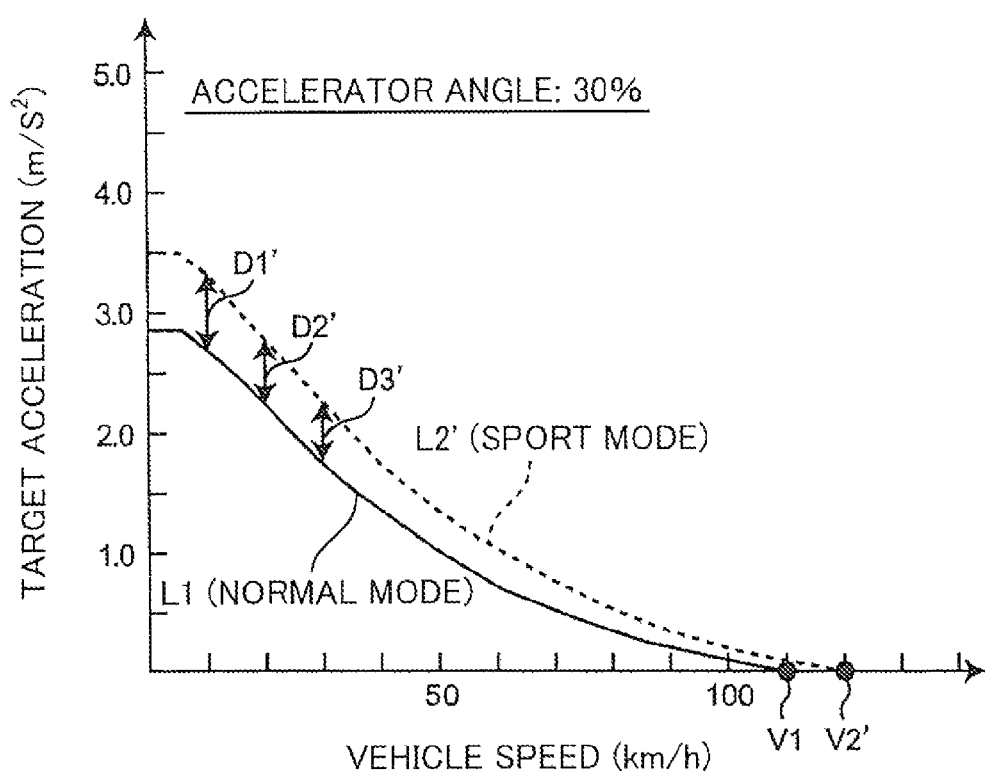
FIG. 6 is a graph illustrating normal-mode and sport-mode target acceleration characteristics in a vehicle control system according to a second embodiment of the present invention.

FIG. 6 is a graph illustrating normal-mode and sport-mode target acceleration characteristics in the vehicle control system according to the second embodiment, wherein a relationship between the vehicle speed and the target acceleration is presented under a condition that the accelerator angle is fixed to 30%. In FIG. 6, the vehicle speed and the target acceleration are plotted, respectively, on the horizontal axis and the vertical axis, wherein the normal-mode target acceleration characteristic and the sport-mode target acceleration characteristic under the condition that the accelerator angle is fixed to 30% are represented, respectively, by the solid line L1 and the dashed line L2'.

As illustrated in FIG. 6, as with the target acceleration characteristics in the first embodiment, in the second embodiment, each of the sport-mode and normal-mode target acceleration characteristics is set in such a manner that the target acceleration becomes smaller along with an increase in the vehicle speed, under a condition that the accelerator angle is maintained constant. However, the sport-mode target acceleration characteristic is set in such a manner that the sport-mode target acceleration is greater than the normal-mode target acceleration, when compared under the same conditions in terms of the accelerator angle and the vehicle speed.

Further, the sport-mode target acceleration characteristic is set in such a manner that a difference between the sport-mode target acceleration and the normal-mode target acceleration becomes smaller along with an increase in the vehicle speed, when compared under the same condition in terms of the accelerator angle. In FIG. 6, as for the difference between the sport-mode target acceleration and the normal-mode target acceleration, values thereof at vehicle speeds of 10 km/h, 20 km/h and 30 km/h are denoted, respectively, by D1', D2' and D3', wherein the difference therebetween is set to satisfy the following relation: D1'>D2'>D3'.

In the second embodiment, the sport-mode target acceleration characteristic is set in such a manner that a vehicle speed at which the sport-mode target acceleration becomes zero is greater than a vehicle speed at which the normal-mode target acceleration becomes zero, when compared under the same condition in terms of the accelerator angle. That is, as illustrated in FIG. 6, under the condition that the accelerator angle is maintained constant, a vehicle speed V2' at which the sport-mode target acceleration becomes zero is set to be greater than the vehicle speed V1 at which the normal-mode target acceleration becomes zero.

FIG. 6 illustrates the normal-mode and sport-mode target acceleration characteristics under the condition that the accelerator angle is fixed to 30%. Similarly, at any other angle (except for 0%) in an accelerator angle range of 0% (non-depressed state) to 100% (fully-depressed state), each of the normal mode and sport-mode target acceleration characteristics is set in such a manner that the target acceleration becomes smaller along with an increase in the vehicle speed.

The relationship between the normal mode target acceleration characteristic and the sport-mode target acceleration characteristic at any other accelerator angle is the same as that under the condition that the accelerator angle is fixed to 30%. That is, the normal-mode and sport-mode target acceleration characteristics are set in such a manner that the sport-mode target acceleration is greater than the normal-mode target acceleration, when compared under the same conditions in terms of the accelerator angle and the vehicle speed, and a difference between the sport-mode target acceleration and the normal-mode target acceleration becomes smaller along with an increase in the vehicle speed, when compared under the same condition in terms of the accelerator angle, and wherein a vehicle speed at which the sport-mode target acceleration becomes zero is greater than a vehicle speed at which the normal-mode target acceleration becomes zero, when compared under the same condition in terms of the accelerator angle.

Although illustration is omitted, in the second embodiment, the normal-mode and sport-mode target acceleration characteristics are set in such a manner that the sport-mode target acceleration is set to be greater than the normal-mode target acceleration, in a given accelerator angle range, when compared under the same condition in terms of the vehicle speed, and a difference between the sport-mode target acceleration and the normal-mode target acceleration is maximized at an approximately central accelerator angle in the given accelerator angle range where the sport-mode target acceleration and the normal-mode target acceleration are different.

As described above, the target acceleration characteristics in the second embodiment are set in such a manner that the sport-mode target acceleration is greater than the normal-mode target acceleration, when compared under the same conditions in terms of the accelerator angle and the vehicle speed, and a difference between the sport-mode target acceleration and the normal-mode target acceleration becomes smaller along with an increase in the vehicle speed, when compared under the same condition in terms of the accelerator angle.

Thus, it becomes possible to enhance vehicle accelerating performance in response to a driver's aggressive intention to further accelerate the vehicle, while suppressing deterioration in fuel economy performance.

In addition, in the second embodiment, when compared under the same condition in terms of the accelerator angle, a vehicle speed at which the sport-mode target acceleration becomes zero is set to be greater than a vehicle speed at which the normal-mode target acceleration becomes zero, so that it becomes possible to accelerate the vehicle to a higher vehicle speed during the sport mode than during the normal mode.

Although preferred embodiments of the invention has been exemplified, it is to be understood that the present invention is not limited to the exemplified embodiments, but various changes and modifications may be made therein without departing from the spirit and scope thereof as set forth in appended claims.

Last of all, distinctive features of the vehicle control system disclosed in the above embodiments and functions and advantageous effects based on the features will be outlined.

The above embodiments relate to a vehicle control system for controlling a vehicle equipped with an engine and a transmission coupled to the engine. The vehicle control system comprises: a mode setting section configured to selectively set one of a normal mode and a sport mode as a vehicle travel mode; a target-acceleration-characteristic storage section storing therein a target acceleration characteristic with respect to each accelerator angle, wherein the target acceleration characteristic is set for each of the normal mode and the sport mode, in such a manner that a target acceleration of the vehicle becomes smaller along with an increase in vehicle speed; a gear-ratio-characteristic storage section storing therein a gear ratio characteristic for changing a gear ratio of the transmission in a given pattern for each of the normal mode and the sport mode, based on the accelerator angle and the vehicle speed; a target acceleration calculation section configured to, in a situation where one of the normal mode and the sport mode is set by the mode setting section, calculate a target acceleration value using the target acceleration characteristic, based on the accelerator angle and the vehicle speed; a gear ratio calculation section configured to, in the situation where one of the normal mode and the sport mode is set by the mode setting section, calculate a gear ratio value using the gear ratio characteristic, based on the accelerator angle and the vehicle speed; and an engine control section configured to, based on the target acceleration value calculated by the target acceleration calculation section, and the gear ratio value calculated by the gear ratio calculation section, control engine output torque in such a manner as to allow an acceleration of the vehicle to become coincident with the calculated target acceleration value. The target acceleration characteristics are set in such a manner that the target acceleration for the sport mode is greater than the target acceleration for the normal mode, when compared under the same conditions in terms of the accelerator angle and the vehicle speed, and a difference between the target acceleration for the sport mode and the target acceleration for the normal mode becomes smaller along with an increase in the vehicle speed, when compared under the same condition in terms of the accelerator angle.

In the above vehicle control system, when compared under the same condition in terms of the accelerator angle, the target acceleration is set to a larger value during the sport mode than during the normal mode, so that it becomes possible to enhance vehicle accelerating performance during the sport mode, in response to a driver's aggressive intention to further accelerate the vehicle. In addition, the difference between the target acceleration for the sport mode and the target acceleration for the normal mode is set to become smaller along with an increase in the vehicle speed, so that it becomes possible to enhance accelerating performance mainly in a low vehicle speed region where a driver would have a desire for particularly high accelerating ability. On the other hand, accelerating performance in a high vehicle speed region is not enhanced beyond necessity, so that it becomes possible to effectively suppress deterioration in fuel economy performance.

Preferably, in the above vehicle control system, the target acceleration characteristics are set in such a manner that a vehicle speed at which the target acceleration for the sport mode becomes zero is equal to a vehicle speed at which the target acceleration for the normal mode becomes zero, when compared under the same condition in terms of the accelerator angle.

This feature makes it possible to prevent a situation where, when the switching between the normal mode and the sport mode is performed during a constant speed travel in which the target acceleration is set to zero, an acceleration is produced, thereby causing a feeling of strangeness.

Alternatively, in the above vehicle control system, the target acceleration characteristics may be set in such a manner that a vehicle speed at which the target acceleration for the sport mode becomes zero is greater than a vehicle speed at which the target acceleration for the normal mode becomes zero, when compared under the same condition in terms of the accelerator angle.

This feature makes it possible to accelerate the vehicle to a higher vehicle speed during the sport mode than during the normal mode.

Preferably, in the above vehicle control system, the target acceleration characteristics are set in such a manner that the target acceleration for the sport mode is greater than the target acceleration for the normal mode, in a given accelerator angle range, when compared under the same condition in terms of the vehicle speed, wherein a difference between the target acceleration for the sport mode and the target acceleration for the normal mode is maximized at an approximately central accelerator angle in the given accelerator angle range.

This feature makes it possible to, sufficiently enhance the accelerating performance during the sport mode, in an intermediate accelerator angle region which is frequently used during an accelerating operation.

For example, the accelerator angle at which the difference between the target acceleration for the sport mode and the target acceleration for the normal mode is maximized is largely shifted toward a small angle side or a large angle side, with respect to the center of the given accelerator angle range, a difference in the target acceleration (amount of corrective increase) at the center of the given accelerator angle range is reduced, which is likely to cause a situation where the accelerating performance cannot be sufficiently enhanced in the intermediate accelerator angle region which is frequently used during an accelerating operation. In contrast, when the difference between the target acceleration for the sport mode and the target acceleration for the normal mode is set to be maximized at the approximately central accelerator angle in the given accelerator angle range, as in the above feature, the target acceleration can be correctively increased intensively in the intermediate accelerator angle region which is frequently used during an accelerating operation, so that it becomes possible to give, to a driver who has selected the sport mode, good acceleration feel more suited to an intention of the driver.

INDUSTRIAL APPLICABILITY

As mentioned above, the vehicle control system of the present invention is capable of enhancing vehicle accelerating performance in response to a driver's aggressive intention, while suppressing deterioration in fuel economy performance. Thus, the present invention can be suitably used in the industrial field of manufacturing of the above type of vehicle.

This application is based on Japanese Patent application No. 2013-145998 filed in Japan Patent Office on Jul. 12, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A vehicle control system for controlling a vehicle equipped with an engine and a transmission coupled to the engine, comprising:

a mode setting section configured to selectively set one of a normal mode and a sport mode as a vehicle travel mode;

a target-acceleration-characteristic storage section storing therein a target acceleration characteristic with respect to each accelerator angle, the target acceleration characteristic being set for each of the normal mode and the sport mode, in such a manner that a target acceleration of the vehicle becomes smaller along with an increase in vehicle speed;

a gear-ratio-characteristic storage section storing therein a gear ratio characteristic for changing a gear ratio of the transmission in a given pattern for each of the normal mode and the sport mode, based on the accelerator angle and the vehicle speed;

a target acceleration calculation section configured to, in a situation where one of the normal mode and the sport mode is set by the mode setting section, calculate a target acceleration value using the target acceleration characteristic, based on the accelerator angle and the vehicle speed;

a gear ratio calculation section configured to, in the situation where one of the normal mode and the sport mode is set by the mode setting section, calculate a gear ratio value using the gear ratio characteristic, based on the accelerator angle and the vehicle speed; and an engine control section configured to, based on the target acceleration value calculated by the target acceleration calculation section, and the gear ratio value calculated by the gear ratio calculation section, control engine output torque in such a manner as to allow an acceleration of the vehicle to become coincident with the calculated target acceleration value, wherein the target acceleration characteristics are set in such a manner that the target acceleration for the sport mode is greater than the target acceleration for the normal mode, when compared under the same conditions in terms of the accelerator angle and the vehicle speed, and a difference between the target acceleration for the sport mode and the target acceleration for the normal mode becomes smaller along with an increase in the vehicle speed, when compared under the same condition in terms of the accelerator angle.

2. The vehicle control system as defined in claim 1, wherein the target acceleration characteristics are set in such a manner that a vehicle speed at which the target acceleration for the sport mode becomes zero is equal to a vehicle speed at which the target acceleration for the normal mode becomes zero, when compared under the same condition in terms of the accelerator angle.

3. The vehicle control system as defined in claim 1, wherein the target acceleration characteristics are set in such a manner that a vehicle speed at which the target acceleration for the sport mode becomes zero is greater than a vehicle speed at which the target acceleration for the normal mode becomes zero, when compared under the same condition in terms of the accelerator angle.

4. The vehicle control system as defined in claim 1, wherein the target acceleration characteristics are set in such a manner that the target acceleration for the sport mode is greater than the target acceleration for the normal mode, in a given accelerator angle range, when compared under the same condition in terms of the vehicle speed, and wherein a difference between the target acceleration for the sport mode and the target acceleration for the normal mode is maximized at an approximately central accelerator angle in the given accelerator angle range.

5. The vehicle control system as defined in claim 2, wherein the target acceleration characteristics are set in such a manner that the target acceleration for the sport mode is greater than the target acceleration for the normal mode, in a given accelerator angle range, when compared under the same condition in terms of the vehicle speed, and wherein a difference between the target acceleration for the sport mode and the target acceleration for the normal mode is maximized at an approximately central accelerator angle in the given accelerator angle range.

6. The vehicle control system as defined in claim 3, wherein the target acceleration characteristics are set in such a manner that the target acceleration for the sport mode is greater than the target acceleration for the normal mode, in a given accelerator angle range, when compared under the same condition in terms of the vehicle speed, and wherein a difference between the target acceleration for the sport mode and the target acceleration for the normal mode is maximized at an approximately central accelerator angle in the given accelerator angle range.

* * * * *